W. C. ALLEN.
VEHICLE WHEEL.
APPLICATION FILED OCT. 6, 1911.
1,036,533.
Patented Aug. 27, 1912.
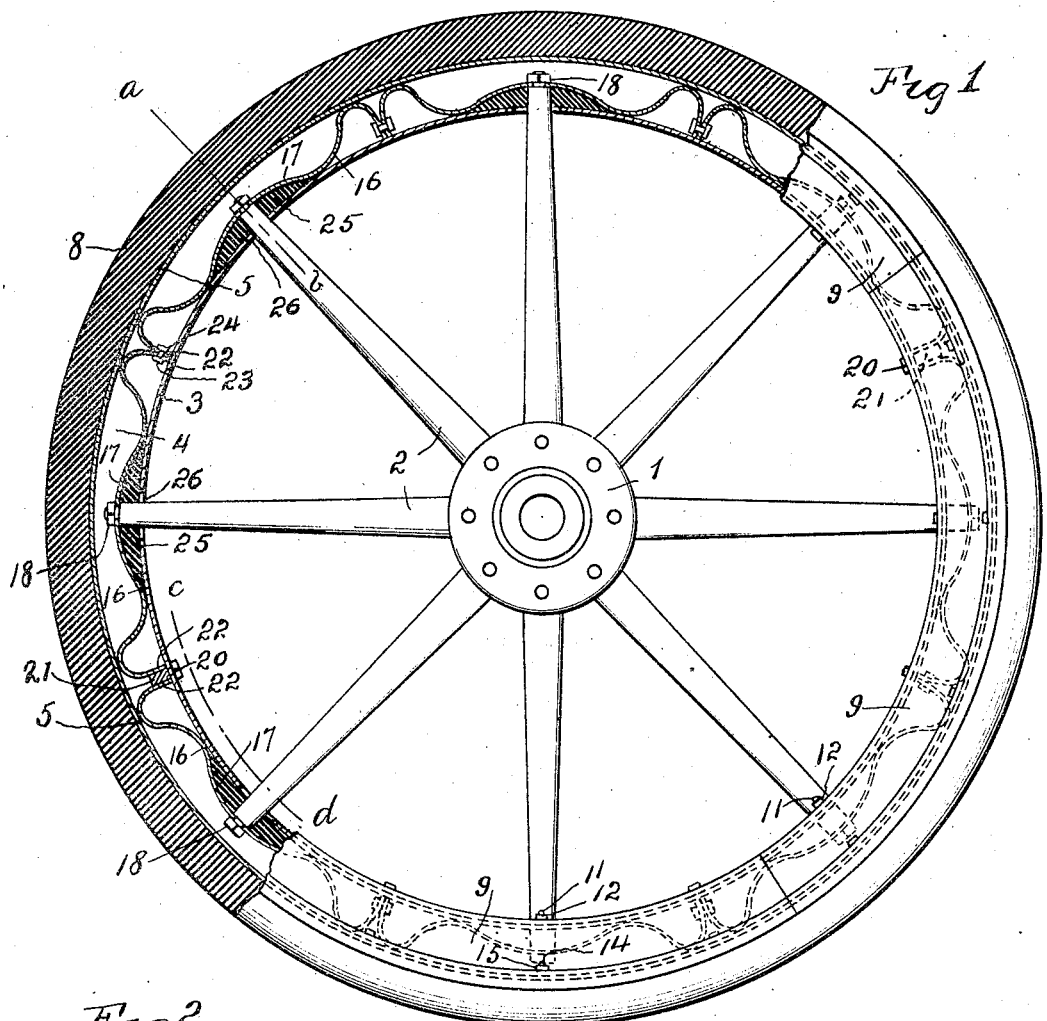
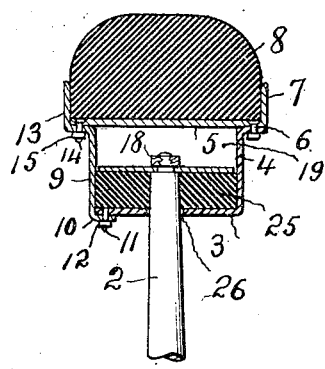
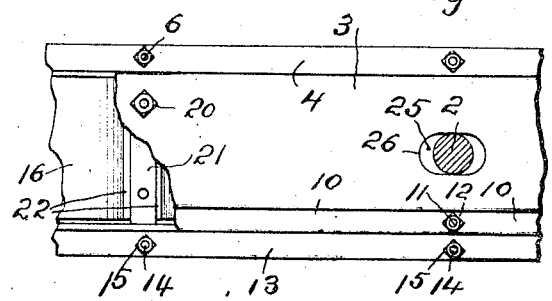
WITNESSES:
R. E. Hamilton
E. B. House
INVENTOR.
Wilburn C. Allen
BY Warren D. House
His ATTORNEY.

UNITED STATES PATENT OFFICE.

WILBURN C. ALLEN, OF KANSAS CITY, MISSOURI.

VEHICLE-WHEEL.

1,036,533.  Specification of Letters Patent.  Patented Aug. 27, 1912.

Application filed October 6, 1911. Serial No. 653,098.

*To all whom it may concern:*

Be it known that I, WILBURN C. ALLEN, a citizen of the United States, residing at Kansas City, in the county of Jackson and State of Missouri, have invented a certain new and useful Improvement in Vehicle-Wheels, of which the following is a specification.

My invention relates to improvements in vehicle wheels.

The object of my invention is to provide a cheaply manufactured, durable and efficient vehicle wheel which will possess many advantages of a wheel having a pneumatic tire without having the disadvantage of liability of puncture.

The novel features of my invention are hereinafter fully described and claimed.

In the accompanying drawings which illustrate one form of my invention, Figure 1 is a view partly in side elevation and partly broken away of my improved vehicle wheel. Fig. 2 is an enlarged cross section on the line *a—b* of Fig. 1. Fig. 3 is an enlarged sectional view on the line *c—d* of Fig. 1.

Similar reference characters designate similar parts.

1 designates the hub of the wheel, 2, spokes secured to the hub 1 and having shouldered and screw threaded outer ends.

The rim of the wheel comprises preferably the following described parts:—3 designates the inner annular member of the rim, said member having an annular right angled flange 4 which is secured to an outer annular member 5 by radial bolts 6. The outer annular rim member 5 is provided at one edge with an outwardly extending annular flange 7 which forms one side of an annular channel adapted to contain a resilient tire 8. The side of the rim opposite to the flanges 4 and 7 preferably comprises side members 9 provided at their inner edges with laterally extending flanges 10 secured to the inner side of the inner member 3 by radial bolts 11 having nuts 12 bearing against the flanges 10. The outer edges of the members 9 are provided with right angled flanges 13 which bear against the inner side of the outer member 5 to which the flanges are detachably secured by radial bolts 14 on which are mounted nuts 15 which bear against the member 5. The flanges 13 extend outwardly beyond the member 5 and form the other side of the annular channel in which is located the tire 8.

16 designates leaf springs having central portions 17 of bow shape respectively detachably mounted on the shouldered ends of the spokes 2 between the inner and outer members 3 and 4. Nuts 18 mounted on the threaded portions of the spokes 2 releasably secure the springs 16 to said spokes. The members 3, 4 and 9 form an annular chamber 19 in the rim. In said chamber and secured to the member 3 by bolts 20 are abutments 21 which serve to limit the sliding movement of the springs 16 in the chamber 19. Said springs each having radially disposed end portions 22 which bear against and are slidable upon the inner member 30. Each spring 16 at opposite sides of the adjacent spoke 2 slidably bears against the inner member 3, and at two points between the central portion 17 and the portions 22 slidably bears against the outer member 5. The ends of the springs which at like sides of the abutments 21 are preferably detachably connected to each other by bolts 23 having mounted thereon clamping nuts 24. Cushions, preferably of soft rubber, and designated by 25 encircle the spokes 2 which extend respectively through slots 26 provided in the inner member 2. The cushions 25 have a bearing against the inner member 3 and against the adjacent springs 16. The cushions 25 further serve to close the slots 26, thereby preventing the admission into chamber 19 through the slots 26 of dirt or moisture.

In the drawings I have shown two diametrically disposed abutments 21 against which are adapted to bear the adjacent ends of the two sets of springs 16 which are disposed at opposite sides of said abutments. By removing the nuts 12 and 15 from the bolts 11 and 14 respectively, the side members 9 may be detached from the members 3 and 5, whereby access may be had to chamber 19 for the replacing of a broken spring 16 or the renewal of a cushion 25. Such removal of the side members 9 also permits the removal of the tire 8 and its replacement by another tire.

I do not limit my invention to the structure shown and described, as modifications of my invention, within the scope of the appended claims, may be made, without departing from the spirit of my invention.

Having thus described my invention, what I claim and desire to secure by Letters Patent, is:—

1. In a vehicle wheel, a rim having an annular chamber provided with an outer wall and an inner wall having circumferential slots, a hub, spokes secured to the hub and extending through the slots respectively, and leaf springs having central portions respectively secured to said spokes between but out of contact with said inner and outer walls, said springs adjacent to their ends bearing against the outer wall and intermediate of the points where they bear against the outer wall and at opposite sides of said central portions bearing against the inner wall.

2. In a vehicle wheel, a rim having an annular chamber provided with an outer wall and an inner wall having circumferential slots, a hub, spokes secured to the hub and extending through said slots respectively, leaf springs secured respectively to the spokes between the inner and outer walls, each spring at two points adjacent to its respective ends bearing against the outer wall and at two points at opposite sides of the adjacent spoke and between the points of bearing against the outer wall bearing against the inner wall, and cushions between the inner and outer walls and encircling said spokes respectively between the springs and the inner wall.

3. In a vehicle wheel, a rim having an annular chamber provided with an outer wall and an inner wall having circumferential slots, a hub, spokes secured to the hub and extending respectively through said slots, leaf springs secured to said spokes respectively between the inner and outer walls and having at opposite sides of said spokes sliding contact each with the said inner and outer walls, and an abutment secured to the rim in said chamber for limiting the sliding movement of the springs in said chamber.

4. In a vehicle wheel, a rim having an annular chamber provided with an outer wall and an inner wall having circumferential slots, a hub, spokes secured to the hub and extending respectively through said slots, leaf springs secured between the inner and outer walls to said spokes respectively and at opposite sides of the spokes having sliding contact with the inner and outer walls, an abutment secured to the rim in said chamber for limiting the sliding movement of the springs in said chamber, and cushions respectively encircling said spokes and bearing against the inner wall and the inner sides of the springs.

5. In a vehicle wheel, a rim having an annular chamber provided with an outer wall and an inner wall having circumferential slots, a hub, spokes secured to the hub and extending respectively through said slots, two abutments secured to said rim in diametrically opposite positions in said chamber, and two sets of leaf springs disposed at opposite sides of said abutments in said chamber and respectively secured to said spokes, the springs at opposite sides of the spokes bearing slidably upon the inner and outer walls of said chamber.

6. In a vehicle wheel, a rim having an annular chamber provided with an outer wall and an inner wall having circumferential slots, a hub, spokes secured to the hub and respectively extending through said slots, two abutments secured to said rim in diametrically opposite positions in said chamber, two sets of leaf springs disposed at opposite sides of said abutments and respectively secured to said spokes in said chamber, the springs at opposite sides of the spokes slidably bearing against the inner and outer walls of the rim, and cushions respectively encircling said spokes in said chamber and bearing against said springs and the inner wall of the rim.

7. In a vehicle wheel, a rim having an annular chamber provided with an outer wall and an inner wall having circumferential slots, a hub, spokes secured to the hub and extending respectively through said slots, and leaf springs having central portions respectively secured to the spokes between the inner and outer walls and having radially disposed ends bearing against the inner wall, each spring at two points at opposite sides of the adjacent spoke bearing against the inner wall and at points between said points and its ends bearing against the outer wall.

8. In a vehicle wheel, a rim having an annular chamber provided with an outer wall and an inner wall having circumferential slots, a hub, spokes secured to the hub and extending through said slots respectively, leaf springs having central portions respectively secured to said spokes between the inner and outer walls and having radially disposed ends bearing against the inner wall, each spring at two points at opposite sides of the adjacent spoke bearing against the inner wall and at points between the said points and the ends of the spring bearing against the outer wall, and cushions respectively encircling the spokes between and bearing against the springs and the inner wall.

In testimony whereof I have signed my name to this specification in presence of two subscribing witnesses.

WILBURN C. ALLEN.

Witnesses:
 E. B. House,
 Florence M. Vendig.